(12) United States Patent
Fitzgerald

(10) Patent No.: US 7,936,868 B2
(45) Date of Patent: May 3, 2011

(54) METHOD AND SYSTEM FOR AUTOMATICALLY GENERATING FLOW CHARTS OF CALL FLOW PROGRAMS

(75) Inventor: Steven Craig Fitzgerald, Atlantic Mine, MI (US)

(73) Assignee: Consistacom, Inc., Houghton, MI (US)

( * ) Notice: Subject to any disclaimer, the term of this patent is extended or adjusted under 35 U.S.C. 154(b) by 890 days.

(21) Appl. No.: 11/903,573

(22) Filed: Sep. 24, 2007

(65) Prior Publication Data

US 2009/0080641 A1   Mar. 26, 2009

(51) Int. Cl.
*H04M 3/00* (2006.01)
(52) U.S. Cl. .................. 379/266.1; 707/2; 717/133
(58) Field of Classification Search ........... 379/266.1; 707/2; 717/133
See application file for complete search history.

(56) References Cited

U.S. PATENT DOCUMENTS

| | | | |
|---|---|---|---|
| 6,243,092 B1 * | 6/2001 | Okita et al. | 715/866 |
| 6,823,054 B1 | 11/2004 | Suhm et al. | |
| 7,003,507 B2 * | 2/2006 | Tip et al. | 1/1 |
| 2003/0041314 A1 | 2/2003 | Heeren et al. | |

* cited by examiner

*Primary Examiner* — Creighton Smith
(74) *Attorney, Agent, or Firm* — Brooks Kushman P.C.

(57) ABSTRACT

A method and system automatically generates flow charts of call flow programs used in a call center based on information about the call flow program and other telephone system resources collected from the call center. Such collected information includes automatic call distributor (ACD) programming. The method and system generate the flow chart of the call flow programs without prior knowledge of such collected information.

8 Claims, 8 Drawing Sheets

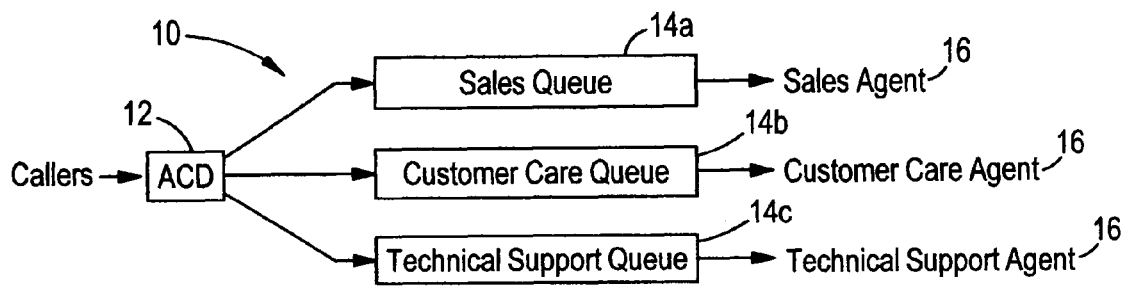
FIG.1
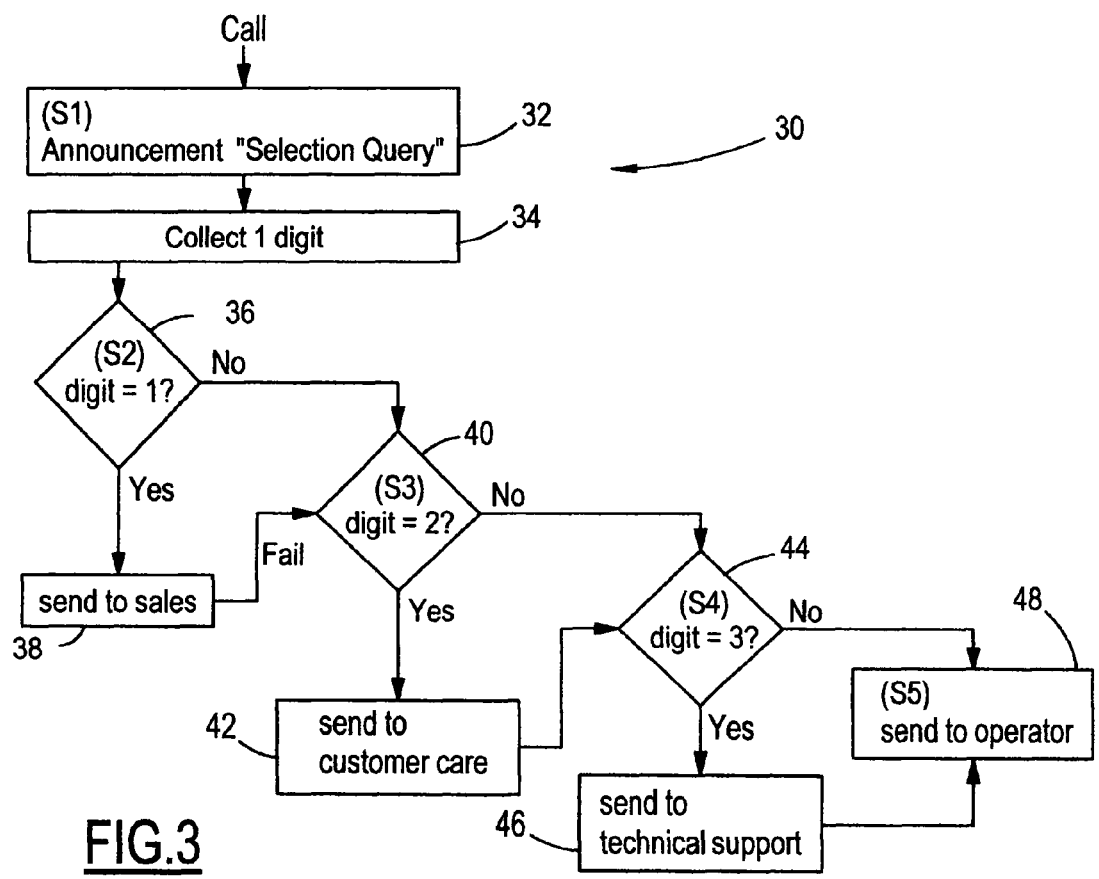
FIG.2
FIG.3

Vector 1351 - "P SA DM / CM OPTS"

| Step | Text |
|---|---|
| 1 | wait-time 1 secs hearing silence |
| 2 | collect 1 digits after announcement 39005 for none |
| 3 | route-to number 35342 with cov n if digit = 1 |
| 4 | route-to number 35343 with cov n if digit = 2 |
| 5 | route-to number 35342 with cov n if unconditionally |
| 6 | stop |

130

Vector 1336 - "SA MS Opt1 toPS"

| | |
|---|---|
| 1 | goto vector 100 @step 1 if staffed-agents in skill 75 > 0 |
| 2 | goto step 15 if holiday in table 1 |
| 3 | goto step 15 if time-of-day is all 18 : 00 to all 09 : 00 |
| 4 | goto step 15 if time-of-day is fri 18 : 00 to mon 09 : 00 |
| 5 | wait-time 1 secs hearing silence |
| 6 | collect 1 digits after announcement 31763 for none |
| 7 | route-to number 35331 with cov n if digit = 1 |
| 8 | route-to number 35332 with cov n if digit = 2 |
| 9 | route-to number 35333 with cov n if digit = 3 |
| 10 | route-to number 35334 with cov n if digit = 4 |
| 11 | route-to number 35335 with cov n if digit = 7 |
| 12 | route-to number 35336 with cov n if digit = 9 |
| 13 | route-to number 35331 with cov n if unconditionally |
| 14 | stop |
| 15 | wait-time 1 secs hearing silence |
| 16 | collect 1 digits after announcement 31764 for none |
| 17 | route-to number 35331 with cov n if digit = 1 |
| 18 | route-to number 35332 with cov n if digit = 2 |
| 19 | route-to number 35333 with cov n if digit = 3 |
| 20 | route-to number 35336 with cov n if digit = 9 |
| 21 | route-to number 35331 with cov n if unconditionally |
| 22 | stop |

FIG.8

System amgcce4 Vector Summary

| Number | Updated | Title | Page |
|---|---|---|---|
| 1323 | Jul 12, 2007 08:51:48 | S SA MS MMOther | 445 |
| 1326 | Jul 12, 2007 08:51:48 | SA PS Main | 447 |
| 1327 | Jul 12, 2007 08:51:48 | P SA GenInfo Op | 450 |
| 1328 | Jul 12, 2007 08:51:48 | P SA PS MM Opts | 453 |
| 1329 | Jul 12, 2007 08:51:48 | P SA DM/CM Opts | 456 |
| 1330 | Jul 12, 2007 08:51:48 | P SA PS BH Opts | 458 |
| 1331 | Jul 12, 2007 08:51:48 | P SA PS Elig | 461 |
| 1332 | Jul 12, 2007 08:51:48 | P SA PS Claims | 463 |
| 1333 | Jul 12, 2007 08:51:48 | P SA PS Gen | 465 |
| 1336 | Jul 12, 2007 08:51:48 | SA MS Opt1 toPS | 467 |
| 1351 | Jul 12, 2007 08:51:48 | P SA DM/CM OPTS | 470 |
| 1500 | Jul 12, 2007 08:51:48 | Menu Opts 123 | 472 |

METHOD AND SYSTEM FOR AUTOMATICALLY GENERATING FLOW CHARTS OF CALL FLOW PROGRAMS

BACKGROUND OF THE INVENTION

1. Field of the Invention

The present invention relates to automatic flow charting of call flow programs used in call centers.

2. Background Art

A "call flow" is a call handling path that a telephone caller follows when calling a call center. The call flow determines the caller experience and is often based on decisions taken in response to touch-tone or spoken input from the caller. A call flow is programmed in a call center as a call flow program having instructions that control ringing, announcements, music on hold, routing to a specific group of agents of the call center at set priorities, and so on. For example, in Avaya communication manager telephone systems, each call flow is programmed as a "vector" using an arcane set of command words and text-based input methods.

A call flow program is often created using a graphic flow chart as a functional specification which is augmented by textual description. A call flow is likely to be updated after being in use at a call center. This entails modifying the call flow program to implement the updates. The flow chart should be updated as well as the flow chart represents key documentation of the call flow. Updating the flow chart to account for the updates requires meticulous attention over time to ensure that all of the updates are accounted. Such a requirement typically results in ignoring the updating of the flow chart for one reason or another. Consequently, call center personnel do not have access to flow charts depicting current call flow programs used in the call center. Such personnel desire to be able to obtain a flow chart which reflects an updated call flow programmed into the call center without already having access to a flow chart of the original call flow program or a flow chart of any previous version of the call flow program.

SUMMARY OF THE INVENTION

An object of the present invention includes a method and system for automatically generating flow charts of call flow programs.

A further object of the present invention includes a method and system for automatically generating a flow chart of a call flow program used in a call center based on information about the call flow program and other telephone system resources collected from the call center.

Another object of the present invention includes a method and system for automatically generating a flow chart of a call flow program used in a call center based on automatic call distributor (ACD) programming collected from the call center.

A further object of the present invention includes a method and system for automatically generating a flow chart of a call flow program used in a call center from programming and configuration information collected from the call center without prior knowledge of such information.

Another object of the present invention includes a method and system for automatically generating a flow chart of a call flow program which include extracting an existing call flow program used in a call center and then generating a flow chart of the call flow program.

In carrying out the above objects and other objects, the present invention provides a method of generating a flow chart of a call flow program. The method includes collecting ACD programming information from an ACD of a call center. The ACD programming information includes a call flow program defining a call handling path. The ACD is programmed with the call flow program to handle calls in accordance with the call handling path. The call flow program includes at least one step having at least one associated instruction. At least one of the instructions has a reference identifier identifying a data object stored in the call center and accessible to the ACD for the ACD to carry out the instruction when carrying out the associated step.

The method includes identifying from the collected programming information the data objects of the call flow program and then obtaining the identified data objects from the call center; determining from the collected programming information which of the steps have two or more instructions.

The method includes splitting each step having two or more instructions into multiple single steps each having a respective one of the instructions; determining the sequential order of the steps from the collected programming information and determining the sequential order of the instructions for each step having two or more instructions; and transforming the instructions into functional phrases which include the identified data objects in place of the associated data objects.

The method includes placing a respective block having the associated functional phrase for each instruction on a drawing, wherein the blocks are placed on the drawing in agreement with the sequential order of the steps and the sequential order of the instructions; and entering connection lines between the blocks on the drawing in accordance with sequential order of the steps and the sequential order of the instructions.

Further, in carrying out the above objects and other objects, an associated system is provided.

The above features, and other features and advantages of the present invention as readily apparent from the following detailed descriptions thereof when taken in connection with the accompanying drawings.

BRIEF DESCRIPTION OF THE DRAWINGS

FIG. 1 illustrates a call center compatible with a method and system for automatically generating flow charts of call flow programs used in the call center in accordance with the present invention;

FIG. 2 illustrates a first call flow program for use in a call center;

FIG. 3 illustrates a flow chart of the first call flow program automatically generated by the method and system in accordance with the present invention;

FIG. 8 illustrates a third call flow program for use in a call center;

FIG. 10 illustrates a summary for the flow charts of the second and third call flow programs automatically generated by the method and system in accordance with the present invention.

DETAILED DESCRIPTION OF THE PREFERRED EMBODIMENT(S)

Figure 4A:
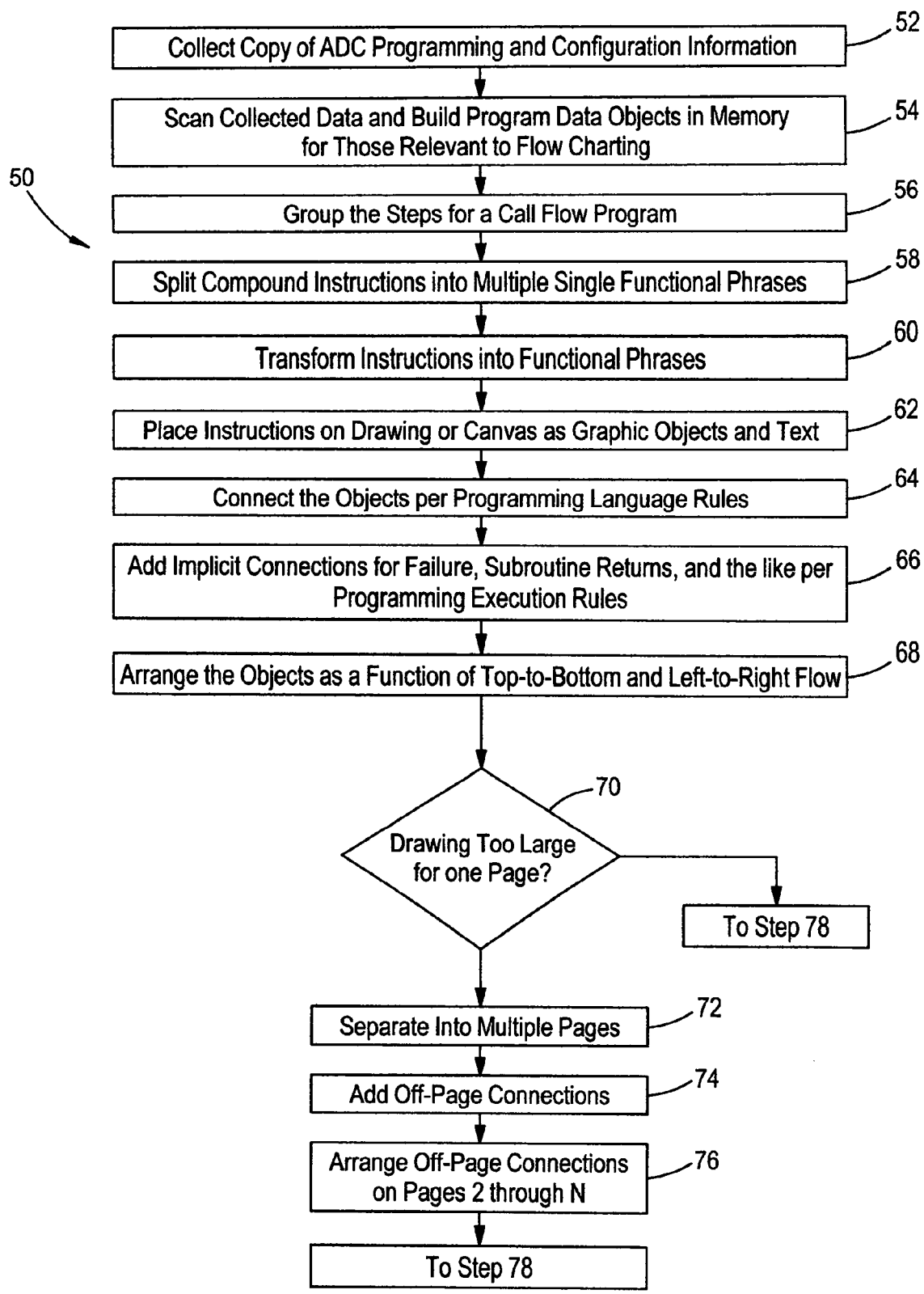
FIG. 4 illustrates a flow diagram describing operation of the method and system for automatically generating flow charts of call flow programs in accordance with the present invention.

Referring now to FIG. 1, a call center 10 compatible with a method and system for automatically generating flow charts of call flow programs used in the call center in accordance with the present invention is shown. Center 10 is operable to interact with incoming calls from callers using interactive voice responses (IVR) in order to answer questions of the callers, provide information requested by the callers to the callers, route the callers to appropriate agents of the call center, etc. Center 10 includes an automatic call distributor (ACD) 12, call queues 14, and agents 16. ACD 12 determines a caller's requirements and provides any available information requested by the caller to the caller using IVR before an agent 16 takes the call. IVR is typically an adjunct process taking place of ACD 12. An agent is a person associated with center 10 to talk with the callers.

ACD 12 is programmed with a plurality of call flow programs in order to handle its duties in interacting with callers. Each call flow program includes a script which ACD 12 follows in handling a call. A script is indicative of a call handling path and identifies functions which ACD 12 is to perform in handling a call. For instance, functions include ACD 12 audibly playing an announcement requesting the caller to enter a touch-tone number for specific selections, processing the call in accordance with the specific selection, etc. In this case, a given selection may correspond to a different call flow program such that ACD 12 subsequently uses this different call flow program to further handle the call. For instance, after the caller makes a first selection from a main menu, ACD 12 audibly requests the caller to make a selection from a sub-menu of choices. A given call flow program may have different scripts depending on the time of day or day of week.

An example of a script of a call flow program is as follows. ACD 12 audibly states to the caller upon receiving a call, "For sales, press one; for customer care, press two; for technical support, press three." ACD 12 then waits for touch-tone or spoken input from the caller indicative of which selection is desired by the caller. Based on the selection, ACD 12 routes the call to a sales agent, a customer care agent, or a technical support agent. An agent may not be available right away to take the call. As such, call center includes call queues 14 which allow the calls to be stacked while waiting for corresponding agents to become available.

Referring now to FIG. 2, with continual reference to FIG. 1, a first call flow program 20 for use in a call center such as call center 10 is shown. A call flow program such as first call flow program 20 is a written software program having a plurality of steps. Each step includes an instruction which is written out as text. As such, first call flow program 20 includes a step column 22 and an instruction column 24.

As an example, first call flow program 20 is based on the example above in which ACD 12 is to route a call to a sales agent, customer care agent, or technical support agent. To this end, call flow program includes steps 22a, 22b, 22c, 22d, and 22e which have associated instructions 24a, 24b, 24c, 24d, and 24e. In first step 22a, first instruction 24a indicates ACD 12 is to audibly play a selection query to the caller and then collect an input digit from the caller. Correspondingly, the text of first instruction 24a is "Collect 1 digit after announcement selection query". The "selection query" is the name of the announcement to be played. This announcement is stored as a data object in memory, an interactive voice response (IVR) unit, or the like. As such, ACD 12 processes first instruction 24a to determine that it needs to retrieve and then audibly play the "selection query" announcement for the caller. In this example, the "selection query" announcement is "For sales, press one; for customer care, press two; for technical support, press three." First instruction 24a further indicates ACD 12 is to collect a digit input from the caller after playing the query. As such, ACD 12 waits for touch-tone or spoken input from the caller indicative of which selection is desired by the caller. After receiving the caller input, ACD 12 proceeds to second step 22b in which second instruction 24b indicates ACD 12 is to route the call to a sales agent if the input is "one". Similarly, third and fourth instructions 24c and 24d of third and fourth steps 22c and 22d respectively indicate ACD 12 is to route the call to a customer care agent if the input is "two" or to a technical support agent if the input is "three". Instruction 24e of last step 22e indicates ACD 12 is to route the call to an operator if the input is something other than "one", "two", or "three" of if there is no input after a time period such as fifteen seconds.

As shown in FIG. 2, first call flow program 20 has a series of steps 22 with each step having an associated instruction 24. Steps 22 and instructions 24 represent the programming language and execution rules of first call flow program 20. Steps 22 and instructions 24 may be presented in a flow chart such that the process (i.e., the flow) of the call handling path associated with first call flow program 20 is more understandable to a reviewer such as call center personnel. Further, a call flow program designer typically initially drafts a flow chart of a call flow path in order to eventually write out the steps and instructions of a call flow program in the format of first call flow program 20 for implementing the call flow path.

Referring now to FIG. 3, with continual reference to FIGS. 1 and 2, a flow chart 30 of first call flow program 20 automatically generated by the method and system in accordance with the present invention is shown. Flow chart 30 includes functional specification augmented by textual description in order to be indicative of the call handling path associated with first call flow program 20. That is, flow chart 30 includes a plurality of graphic objects such as rectangular blocks and diamond blocks indicative for each instruction of first call flow program 20 (other block types may be used for different kinds of instructions). Each block includes a textual description which is a written description of the instruction associated with that block. The blocks are connected by flow arrows to describe how the call handling path flows from the instructions of one step to the instructions of the next step. Further, the flow arrows are labeled (or colored differently) to describe how the call handling path flows in the event of certain occurrences such as selections to choices.

To this end, flow chart 30 includes blocks 32 and 34 which represent the instructions of first step 22a. Instruction 24a of first step 22a includes two instructions: (a) play the "selection query" announcement and (b) collect one digit after the announcement is played. Blocks 32 and 34 respectively correspond to the two instructions with block 32 indicating ACD 12 is to play the "selection query" announcement in response to a call and block 34 indicating ACD 12 is to then collect one digit from the caller. Flow chart 30 includes an arrow from block 32 to block 34 indicating that the call handling path proceeds from block 32 to block 34. As indicated above, the input digit is indicative of the caller's selection in response to the "selection query" announcement. Flow chart 30 further includes decision block 36 and block 38 which represents the two instructions (i.e., check if digit=1? is true; and route to sales agent if digit=1? is true) of second step 22a. An arrow leading from block 34 to decision block 36 represents the transition from first step 22a to second step 22b. Decision block 36 indicates ACD 12 is to determine whether the input from the caller is "one". If so, then block 38 indicates ACD 12 is to route the caller to sales queue 14a. If not, then the call handling path proceeds to third step 22c in which decision block 40 and block 42 represent the two instructions of third step 22c. Decision block 40 indicates ACD 12 is to determine whether the input is "two". If so, then block 42 indicates ACD 12 is to route the caller to customer care queue 14b. If not, then the call handling path proceeds to fourth step 22d in which decision block 44 and block 46 represent the two instructions of fourth step 22d. Decision block 44 indicates ACD 12 is to determine whether the input is "three". If so, then block 46 indicates ACD 12 is to route the caller to technical support queue 14c. If not, then the call handling path proceeds to fifth step 22e in which block 48 represents the instructions of fifth step 22e. Block 48 indicates ACD 12 is to route the caller to an operator as a default option.

First call flow program 20 and flow chart 30 represent the same call handling path. The format of first call flow program 20 is the type of format required for implementing the call handling path as a written software program. The software program type of format is required for programming an ACD for the ACD to carry out the call handling path. However, the software type of format is difficult for a person to be able to understand the underlying call handling path. Flow chart 30 represents a format which enables a person to readily understand the underlying call handling path. As such, it is desired to be able to obtain programming and configuration information used by an ACD for carrying out a call handling path and then convert this obtained information into a flow chart which represents the call handling path.

Figure 4B:
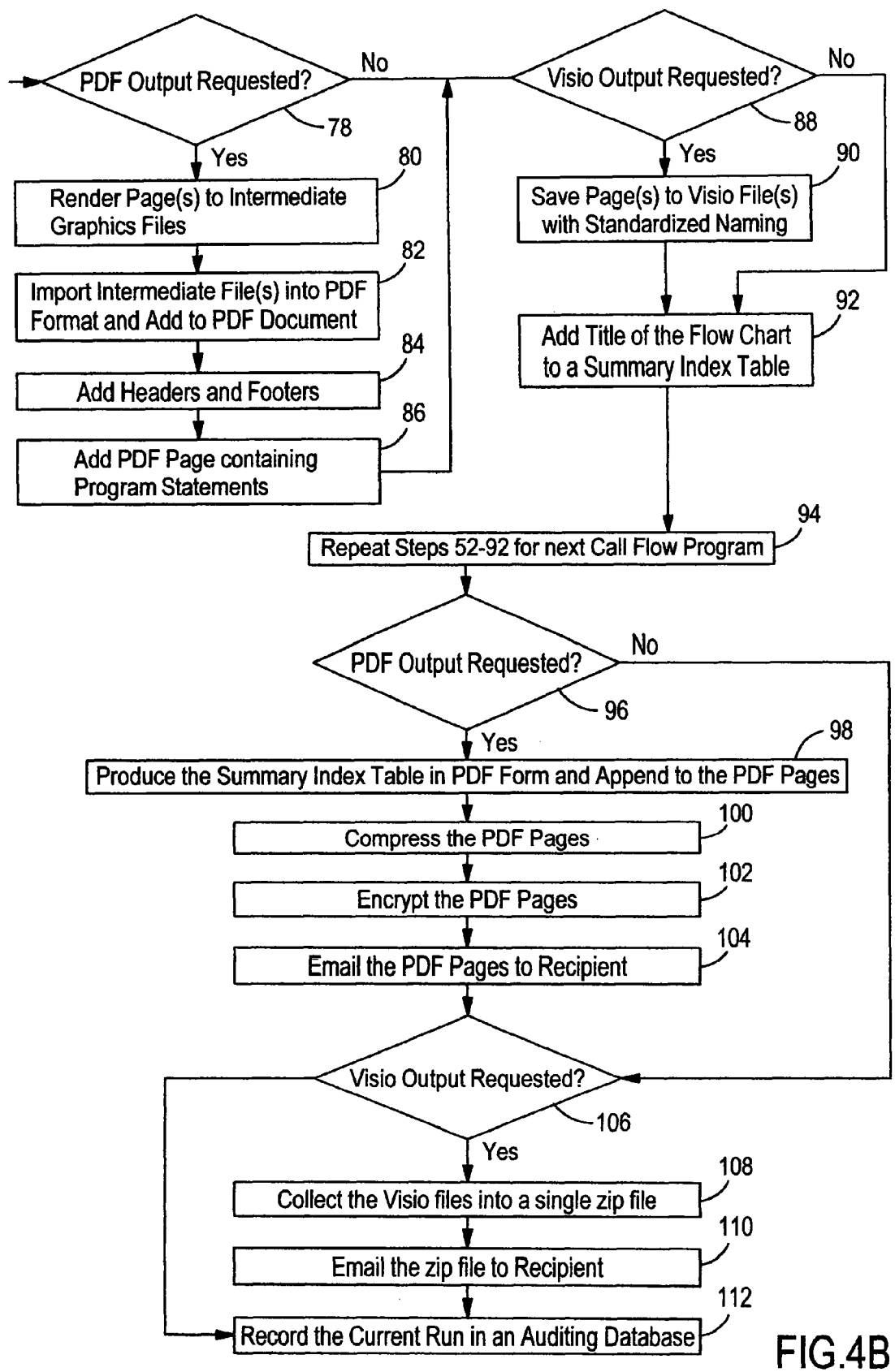

Referring now to FIG. 4, with continual reference to FIGS. 1, 2, and 3, a flow diagram 50 describing operation of the method and system for automatically generating flow charts of call flow programs in accordance with the present invention is shown. Call flow programs currently used in a call center are typically different from the original call flow programs as the call flow programs are usually updated over time. As such, a flow chart of an original call flow program used in a call center is usually not helpful to a reviewer as the flow chart does not accurately depict the current version of the call flow program. Further, any flow charts of call flow programs may not be available. As such, what is needed is a method and system for generating flow charts of current call flow programs used in a call center without requiring any prior knowledge of the call flow programs. The method and system in accordance with the present invention satisfy such need.

The operation of the method and system in accordance with the present invention initially includes collecting from ACD 12 a copy of its programming and configuration information as shown in step 52. That is, a copy of the call flow programs used in call center 10 are obtained from ACD 12. As an example, first call flow program 20 is used in call center. As such, a copy of first call flow program 20 is collected in accordance with step 52.

After a copy of first call flow program 20 and copies of any other call flow programs used in call center 10 are obtained, the operation proceeds with scanning the collected data to build program data objects in memory for those relevant to flow charting as shown in step 54. As indicated above, data objects are contained in instructions. For instance, instruction 24a of step 22a of first call flow program 20 includes the announcement "selection query". This announcement is a data object and is stored in memory within call center 10. As such, step 54 includes determining which objects are contained in the instructions of the call flow programs, obtaining those objects from call center 10 (in conjunction with step 52), and storing those objects for later use in producing the flow charts of the call flow programs.

The operation proceeds by grouping together the steps of a call flow program such as first call flow program 20 as shown in step 56. This entails placing the steps of first call flow program 20 into a table such as shown in FIG. 2. The operation proceeds by splitting compound instructions of each step of first call flow program 20 into multiple single steps as shown in step 58. For instance, instruction 24a of first step 22a includes the two instructions: play "selection query" announcement; and collect one digit after the announcement is played. As such, step 58 includes splitting instruction 24a into the two instructions. This process is performed for each compound instruction of first call flow program 20.

The operation proceeds by transforming the programming language of instructions 24 of first call flow program 20 into functional phrases as shown in step 60. Step 60 represents a textual transformation in which an instruction 24 is converted into descriptive language for use in the flow chart of first call flow program 20. That is, step 60 represents a translation of an instruction (typically written in a cryptic form having numbers representative of data objects and routing recipients) into descriptive language. For instance, step 22a includes instruction 24a "collect 1 digit after announcement selection query". Instruction 24a has been described in this way in order to provide an example to the reader. However, instruction 24a would usually be in a more cryptic form such as "collect 1 digit after announcement 123" where "123" is the data object reference number of the announcement "selection query". As such, the translation carried out in step 60 includes translating "announcement 123" into "announcement selection query". The translation carried out in step 60 may further include replacing or modifying the translation "announcement selection query" with the its actual text (i.e., "For sales, press one; for customer care, press two; for technical support, press three."). As another example, step 22b includes instruction 24b "route to sales agent if digit 1". Again, instruction 24b would usually be in a more cryptic form such as "route-to-number number 456 if digit=1" where "456" is a virtual database number (VDN) indicative of a call flow program for sales queue 16. As such, the translation carried out in step 60 includes translating "route-to-number 456" into "route to sales agent".

The operation proceeds by placing all the instructions of the steps of first call flow program 20 on an in-memory drawing or canvas as graphic objects and associated text as shown in block 62. The graphic objects and the associated text on the drawing or canvas represents an initial phase of the flow chart of first call flow program 20. Each command instruction is placed in rectangular block form with its associated text and each decision instruction is placed in diamond block form with its associated text. For instance, the command instruction "announcement selection query" of step 22a is placed in a rectangular block having the text "announcement 'selection query'" (see, for example, block 32 of FIG. 3). This text may further include, or be replaced by, the transcribed speech of the announcement (i.e., "For sales, press one; for customer care, press two; for technical support, press three."). As another example, decision instruction digit=1 of step 22b is placed in a diamond block having the text "digit=1?" (see, for example, block 36 of FIG. 3).

The operation proceeds by connecting all of the graphic instruction objects on the drawing or canvas per the programming language rules of the instructions as shown in step 64. This entails connecting the graphic instruction boxes by arrows and adding descriptive information for the arrows in accordance with the programming language rules of the instructions. For instance, as indicated above, the diamond block associated with the instruction digit=1? of step 22b (i.e., diamond block 36 of FIG. 3) is to be connected to the rectangular block associated with the instruction "send to sales agent" of step 22b (i.e., rectangular block 38 of FIG. 3) which is to occur if digit=1 is true and is to be connected to the diamond block associated with the instruction digit=2? of step 22c (diamond block 40 of FIG. 3) which is to occur if digit=1 is false. These connections between blocks 38, 40, and 42 are determined from the programming language rules of the associated instructions 24b, 24c. As such, a first arrow from diamond block 36 to rectangular block 38 is drawn on the drawing or canvas which contains blocks 36, 38, 40 in step 64. Likewise, a second arrow from diamond block 38 to diamond block 40 is drawn on the drawing or canvas in step 64. Descriptive information of arrows based on the programming language rules is also provided on the drawing or canvas. For instance, rectangular block 38 ("send to sales agent") is enabled if digit=1 is true (i.e., the caller wants to talk to a sales agent). As such, a "Yes" legend is placed next to first arrow to thereby indicate that the call handing path is to proceed from decision block 36 to rectangular block 38 if digit=1 is true. Similarly, decision block 40 (digit=2?) is enabled if digit=1 is false. As such, a "No" legend is placed next to second arrow to thereby indicate that the call handling path is to proceed from decision block 36 to decision block 40 if digit=1 is not true. The "Yes" and "No" arrow paths may also be colored differently to be further descriptive.

The operation proceeds by adding implicit connections for failures, subroutines, etc., per the programming execution rules as shown in step 66. An example of this is as follows. The instruction "send to sales agent" of step 22b (i.e., rectangular block 38 of FIG. 3) is to occur if digit=1 is true. However, it may be that the a sales agent is not available to take the call and, consequently, this instruction is not carried out (i.e., fails). It is implicit that the call is to be transferred to the operator in the event that it cannot be sent to a sales agent. This can be represented on the flow chart by proceeding from rectangular block 38 to decision block 40 which eventually connects to the instruction "send to operator" (i.e., rectangular block 48 of FIG. 3) if digit=2 and digit=3 are not true (which will occur as digit=1 is true). As such, there is an implicit "Fail" connection arrow from rectangular block 38 to decision block 40. As such, a third arrow from rectangular block 38 to decision block 40 is drawn on the drawing or canvas and this arrow is labeled with a "Fail" legend.

The operation proceeds by arranging the graphic objects (i.e., the blocks and their associated texts) with their labeled connections on the drawing or canvas in accordance with top-to-bottom and left-to-right flows through the call handling path as shown in step 68. For instance, the graphic objects associated with first step 22a are arranged in the top left-hand corner of the drawing or canvas, the graphic objects associated with second step 22b are arranged beneath the graphic objects associated with first step 22, the graphic objects associated with third step 22c are placed to the right of the graphic objects associated with second step 22b, etc. This arrangement follows the sequential process defined by the instructions of steps 22. As a result, the drawing or canvas appears like the flow chart of first call flow program 20 as shown in FIG. 3.

Typically, a one-page drawing or canvas is not large enough to contain all of the graphic objects and associated text of a call flow program flow chart. As such, the operation proceeds by determining whether the flow chart is too large for a page as shown in step 70. This entails determining whether any part of the flow chart exceeds bottom and right-hand page breaks. If so, then the operation proceeds by separating the flow chart into multiple pages as shown in step 72. This entails determining logical places to separate the flow chart based on top-to-bottom and left-to-right call handling path flow. For instance, the flow chart is logically separated such that the instructions of each step are contained on the same page. As an example, step 22a includes the two instructions (a) play selection query and (b) collect 1 digit, and step 22b includes the two instructions (c) does digit=1? and (d) send to sales agent if digit=1 is true. It may be that a first page has enough room to contain the blocks (blocks 32, 34, 36 of FIG. 2) for instructions a, b, c but not the block (block 38) for instruction d which has to be therefore placed on a second page. As instructions c and d are part of the same step, blocks 36, 38 for instructions c and d are placed on the second page while blocks 32, 34 for instructions a and b are placed on the first page.

The operation of separating the flow chart into multiple pages as shown in step 72 further includes adding off-page connections as shown in step 74. This entails placing a pentagram block having a letter label on the flow chart for each off-page connection. As an example, as described above, blocks 32, 34 for instructions a and b of step 22a are shown on the first page and blocks 36, 38 for instructions c and d of step 22b are shown on the second page. The call handling path flows from block 34 to block 36 and, as such, an arrow is to lead from block 34 to block 36. If both blocks 34 and 36 were on the same page, then the arrow would be shown on the page connecting blocks 34 and 36. However, as blocks 34 and 36 are on different pages, then the arrow is shown on the first page leading from block 34 to a pentagram block having a letter label such as "A". Likewise, a pentagram block having the letter label A is shown on the second page with an arrow leading from this block to block 36. An example of this is in the flow chart shown on FIG. 9.

The operation proceeds by arranging off-page connections on pages 2 through N for clarity as shown in step 76. In the example above, the first page has one off-page connection "A". Consequently, the off-page connection "A" is shown on the second page. If the first page had two off-page connections "A" and "B", then the off-page connection "A" is shown on the second page and the off-page connection "B" is shown on a third page in accordance with step 76. This process is performed for any page having an off-page connection. For instance, the second page having off-page connection "A" may itself having additional off-page connections such as "C" and "D". As such, off-page connection "C" is shown on a fourth page and off-page connection "D" is shown on a fifth page.

At this point of the operation, a flow chart for a single call flow program is obtained. As indicated, the flow chart is set forth on one or more pages.

The operation proceeds by determining whether a pdf output of the flow chart is requested as shown in step 78. If so, then each page is rendered to an intermediate graphic file as shown in step 80. Each intermediate graphic file is then imported into pdf format and added to the pdf document as shown in step 82. Headers and footer information are then added to each page as shown in step 84. A pdf page(s) containing the program statements (i.e., the steps and instructions) is then added as shown in step 86. This page(s) containing the program statements is in the table format as shown in FIG. 2.

If a pdf output of the flow chart is not requested in step 78, then the operation proceeds by determining whether a Visio output of the flow chart is requested as shown in step 88. If so, then each page is saved to a Visio file with standardized naming as shown in step 90.

The operation then proceeds to adding a title of the flow chart to a summary index table as shown in step 92. The title is the title of the call flow program and is part of the programming and configuration information collected from the ACD in step 52. The page numbers or starting page number of the flow chart is also added in the summary index table with the title of the flow chart.

The steps from step 52 through step 92 are then performed for the next call flow program as shown in step 94. As a result, a flow chart for each of the call flow programs is generated. The summary index table includes a title for each call flow program and further includes the page numbers (or starting page) of the corresponding flow charts.

After all of the flow charts and the summary index page have been generated, the operation proceeds by determining whether a pdf output was requested as shown in step 96. If so, then the summary index table is produced in pdf form and appended to the pdf pages of the flow charts as shown in step 98. The pdf flow chart pages and the pdf summary index table are then compressed as shown in step 100, encrypted if desired as shown in step 102, and then emailed to a recipient if desired as shown in step 104.

If pdf output was not requested, then the operation proceeds by determining whether Visio output was requested as shown in step 106. If so, then each the Visio files are collected into a single zip file as shown in step 108 and then emailed to a recipient as a zip file if desired in step 110.

If no output is requested at the present time, then the operation proceeds by recording the current run (i.e., the flow charts and summary index table for the call flow programs generated at this point in time) in an auditing database as shown in step 112.

Figures 5, 6:
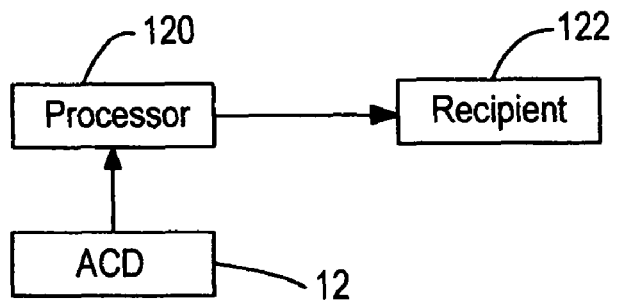
FIG. 5 illustrates a block diagram of the system for automatically generating flow charts of call flow programs in accordance with the present invention.
FIG. 6 illustrates a second call flow program for use in a call center.

Referring now to FIG. 5, a block diagram describing the interaction of a system for automatically generating flow charts of call flow programs in accordance with the present invention is shown. The system includes a processor 120 is in communication with ACD 12 of call center 10 for obtaining the programming and configuration information of the ACD. As described, the programming and configuration information is indicative of the call flow programs used in the call center as well as the resources (i.e., data objects) contained in the steps and instructions of the call flow programs. Processor 120 processes the programming and configuration information to automatically generate the flow charts of the call flow programs in accordance with the operation shown in FIG. 4. In turn, processor 120 provides the flow charts and related information to a recipient 122 via email or the like.

FIG. 6 illustrates a second call flow program 130 for use in a call center is shown. Second flow program 130 includes a series of steps 1-6 with each step having an instruction written out as text. The call handling path of second call flow program 130 is similar to the call handing path of first call flow program 20 in that an announcement requesting the caller to enter a selection is played and then the call is routed based on the selection. The text of the instructions of second call flow program 130 is written out in the more cryptic, but typical fashion. For example, this text includes reference numbers for data objects such as the reference number "39005" for the selection query announcement instead of stating "announcement selection query" as done in first call flow program 20. Likewise, this text include reference numerals for VDNs such as the reference numeral "35342" for a "route to sales agent" command instead of stating "routing to sales agent" as done in first call flow program 20. Such reference numerals are legends which identify the data objects and VDNs contained in the instructions. The actual data objects and VDN information are stored in memory in call center 10 for use by ACD 12 when following a call handling program to handle a call. Likewise, the method and system use this identification information to obtain the data object and VDN information from the call center in order to perform their function of generating call flow charts.

Figure 7:
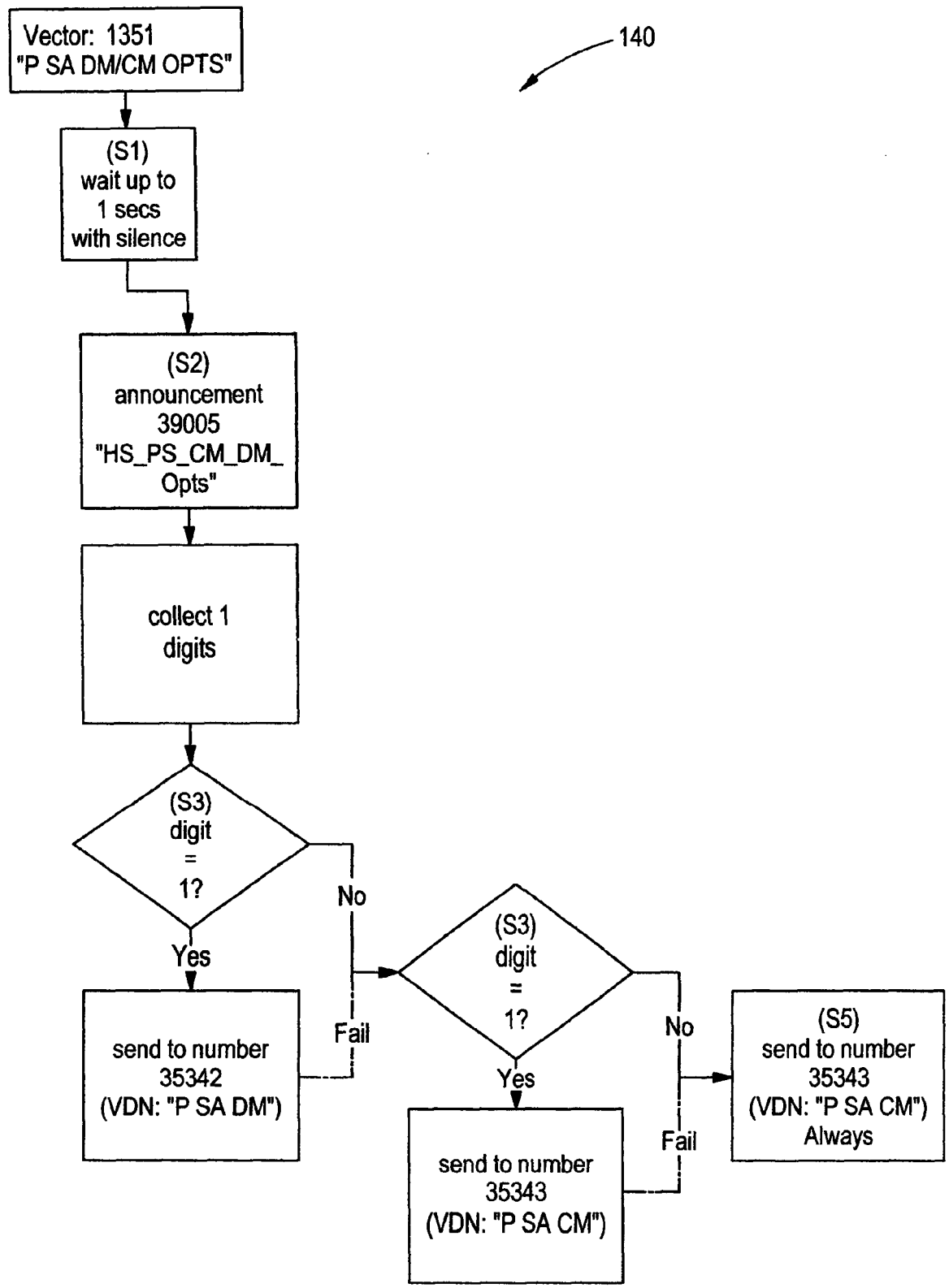
FIG. 7 illustrates a flow chart of the second call flow program automatically generated by the method and system in accordance with the present invention.

FIG. 7 illustrates a flow chart 140 of second call flow program 130 automatically generated by the method and system in accordance with the present invention. Flow chart 140 fits on one page as all of the blocks for the instructions of the steps 1-6 of second call flow program can be accommodated on one page.

Figure 9A:
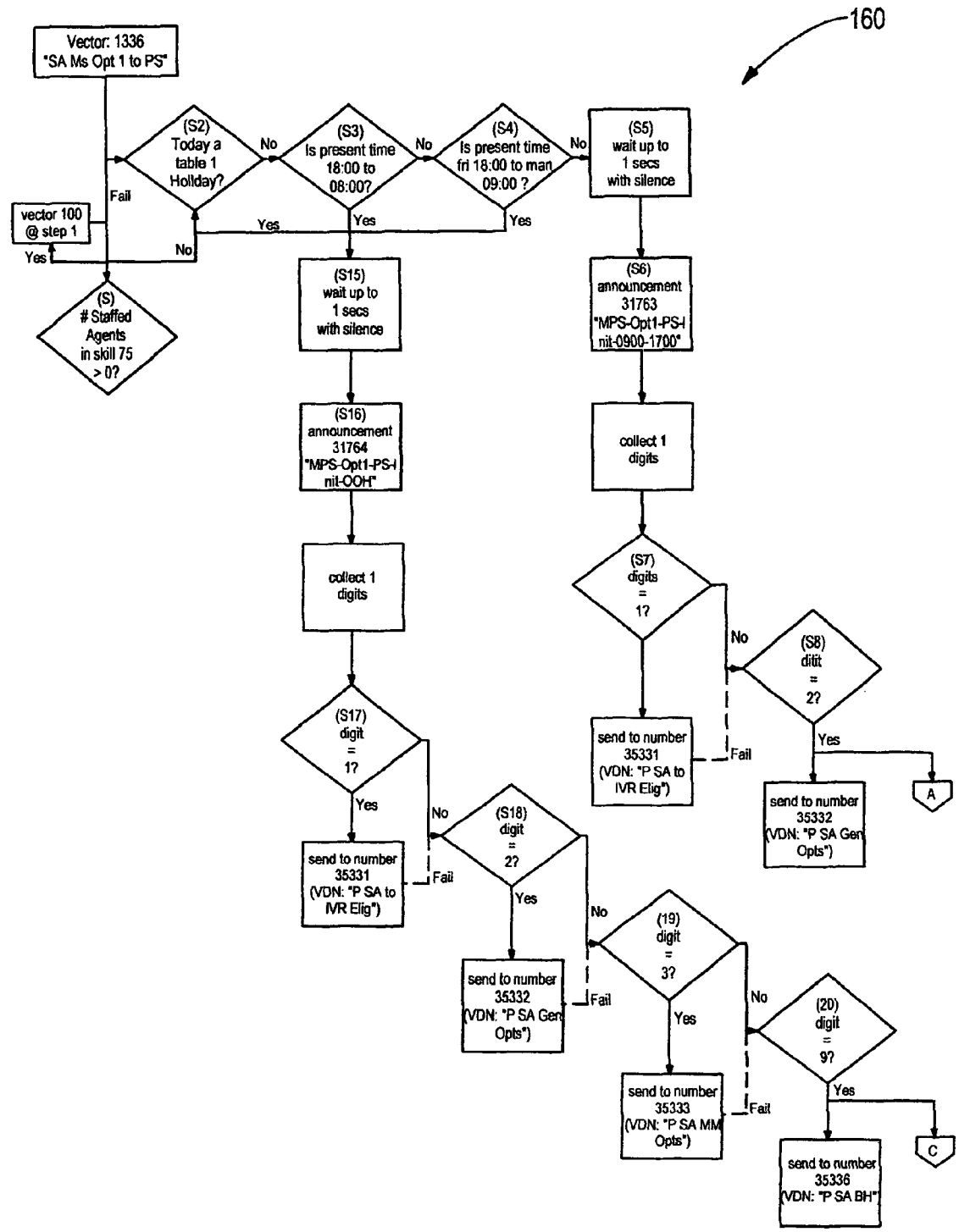
FIG. 9 illustrates a flow chart of the third call flow program automatically generated by the method and system in accordance with the present invention.
Figure 9B:
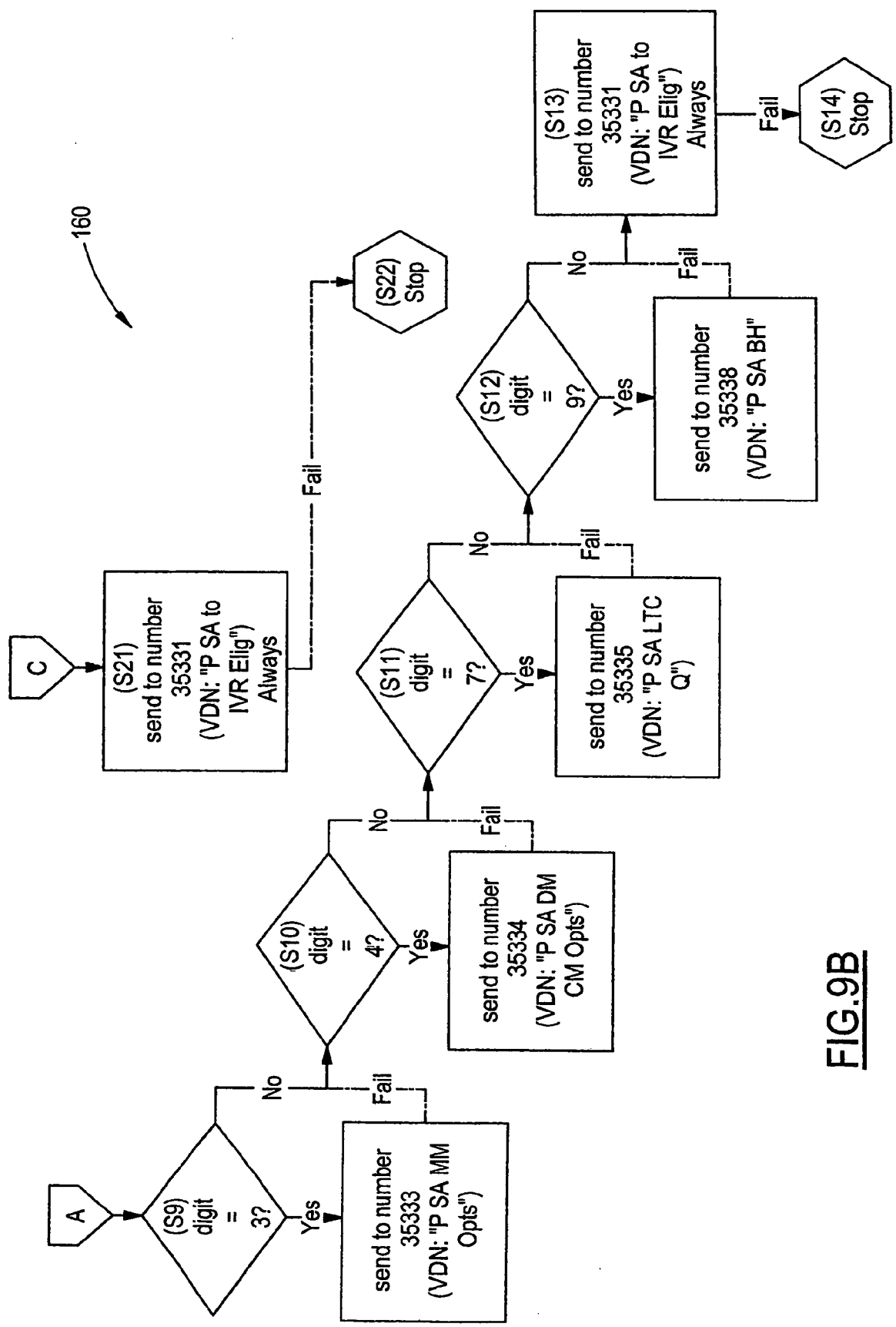

Similarly, FIG. 8 illustrates a third call flow program 150 for use in a call center. FIGS. 9a and 9b illustrate the two pages of a flow chart 160 of third call flow program 150 automatically generated by the method and system in accordance with the present invention.

FIG. 10 illustrates a summary index table 170 for the flow charts of the call flow programs generated by the method and system in accordance with the present invention. Summary index table 170 includes respective entries 172 and 174 for flow charts 140 and 160 of second and third call flow programs 130 and 150.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method of generating a flow chart of a call flow program, the method comprising:

collecting automatic call distributor (ACD) programming information from an ACD of a call center, wherein the ACD programming information includes a call flow program defining a call handling path, wherein the ACD is programmed with the call flow program to handle calls in accordance with the call handling path, wherein the call flow program includes at least one step having at least one associated instruction, wherein at least one of the instructions has a reference identifier identifying a data object stored in the call center and accessible to the ACD for the ACD to carry out the instruction when carrying out the associated step;

identifying from the collected programming information the data objects of the call flow program and then obtaining the identified data objects from the call center;

determining from the collected programming information which of the steps have two or more instructions;

splitting each step having two or more instructions into multiple single steps each having a respective one of the instructions;

determining the sequential order of the steps from the collected programming information and determining the sequential order of the instructions for each step having two or more instructions;

transforming the instructions into functional phrases which include the identified data objects in place of the associated data objects;

placing a respective block having the associated functional phrase for each instruction on a drawing, wherein the blocks are placed on the drawing in agreement with the sequential order of the steps and the sequential order of the instructions; and entering connection lines between the blocks on the drawing in accordance with sequential order of the steps and the sequential order of the instructions.

2. The method of claim 1 further comprising:

determining whether the drawing is accommodated on one page; and dividing the drawing into multiple pages if the drawing is not accommodated on one page, wherein dividing the drawing includes placing some of the blocks on one page and placing other ones of the blocks on a different page.

3. The method of claim 2 further comprising:

for each pair of blocks having a connection line and placed on different pages, replacing the connection line between the blocks with a connection line extending from one of the blocks on one page and a connection line extending to the other one of the blocks on the other page.

4. The method of claim 3 further comprising:

entering a label next to the connection line extending from one of the blocks on one page and the same label next to the connection line extending to the other one of the blocks on the other page.

5. The method of claim 1 wherein each instruction is either a command instruction or a decision instruction, the method further comprising:

determining which instructions are command instructions and which instructions are decision instructions;

wherein placing a respective block having the associated functional phrase for each instruction on the drawing includes placing a rectangular block for each command instruction and placing a diamond block for each decision instruction.

6. The method of claim 5 wherein:

entering connection lines between the blocks on the drawing includes placing either a "Yes" or "No" legend next to each connection line from a diamond block.

7. A method of generating flow charts of call flow programs, the method comprising:

collecting automatic call distributor (ACD) programming information from an ACD of a call center, wherein the ACD programming information includes call flow programs defining call handling paths, wherein the ACD is programmed with the call flow programs to handle calls in accordance with the call handling path, wherein the call flow programs include at least one step having at least one associated instruction, wherein at least one of the instructions has a reference identifier identifying a data object stored in the call center and accessible to the ACD for the ACD to carry out the instruction when carrying out the associated step;

identifying from the collected programming information the data objects of the call flow programs and then obtaining the identified data objects from the call center;

determining from the collected programming information which of the steps have two or more instructions;

splitting each step having two or more instructions into multiple single steps each having a respective one of the instructions;

determining the sequential order of the steps from the collected programming information and determining the sequential order of the instructions for each step having two or more instructions;

transforming the instructions into functional phrases which include the identified data objects in place of the associated data objects;

for each call flow program, placing a respective block having the associated functional phrase for each instruction on a drawing, wherein the blocks are placed on the drawing in agreement with the sequential order of the steps and the sequential order of the instructions, and entering connection lines between the blocks on the drawing in accordance with sequential order of the steps and the sequential order of the instructions.

8. A system of generating a flow chart of a call flow program, the system comprising:

a processor in communication with an automatic call distributor (ACD) of a call center, wherein the processor collects ACD programming information from the ACD, wherein the ACD programming information includes a call flow program defining a call handling path, wherein the ACD is programmed with the call flow program to handle calls in accordance with the call handling path, wherein the call flow program includes at least one step having at least one associated instruction, wherein at least one of the instructions has a reference identifier identifying a data object stored in the call center and accessible to the ACD for the ACD to carry out the instruction when carrying out the associated step;

wherein the processor identifies from the collected programming information the data objects of the call flow program and then obtaining the identified data objects from the call center;

wherein the processor determines from the collected programming information which of the steps have two or more instructions;

wherein the processor splits each step having two or more instructions into multiple single steps each having a respective one of the instructions;

wherein the processor determines the sequential order of the steps from the collected programming information and determining the sequential order of the instructions for each step having two or more instructions;

wherein the processor transforms the instructions into functional phrases which include the identified data objects in place of the associated data objects;

wherein the processor places a respective block having the associated functional phrase for each instruction on a drawing, wherein the blocks are placed on the drawing in agreement with the sequential order of the steps and the sequential order of the instructions; and wherein the processor enters connection lines between the blocks on the drawing in accordance with sequential order of the steps and the sequential order of the instructions.

* * * * *